(12) United States Patent
Bodine

(10) Patent No.: US 8,487,836 B1
(45) Date of Patent: Jul. 16, 2013

(54) MULTI-DIMENSIONAL IMAGE RENDERING DEVICE

(76) Inventor: Thomas A. Bodine, San Leandro, CA (US)

(*) Notice: Subject to any disclaimer, the term of this patent is extended or adjusted under 35 U.S.C. 154(b) by 421 days.

(21) Appl. No.: 12/855,208

(22) Filed: Aug. 12, 2010

Related U.S. Application Data

(60) Provisional application No. 61/241,542, filed on Sep. 11, 2009.

(51) Int. Cl.
*G09G 5/00* (2006.01)

(52) U.S. Cl.
USPC ........ 345/6; 261/29; 261/81; 261/82; 261/93; 261/122.1; 119/245; 119/249; 119/255; 119/261; 119/263

(58) Field of Classification Search
USPC .... 261/29, 81, 82, 93, 122.1; 345/6; 119/245, 119/249, 255, 261, 263
See application file for complete search history.

(56) References Cited

U.S. PATENT DOCUMENTS

| | | |
|---|---|---|
| 2,749,480 A | 6/1956 | Ruderfer |
| 4,134,104 A | 1/1979 | Karras |
| 5,037,105 A | 8/1991 | Klein |
| 5,790,086 A | 8/1998 | Zelitt |
| D415,218 S | 10/1999 | Corliss |
| 6,172,658 B1* | 1/2001 | Romberg .................. 345/30 |
| 6,267,114 B1* | 7/2001 | Ueno .................. 128/202.26 |
| 7,006,056 B1 | 2/2006 | Knabenbauer |
| 2009/0124161 A1* | 5/2009 | Barish .................. 446/15 |

* cited by examiner

*Primary Examiner* — Dwayne Bost
*Assistant Examiner* — Yungsang Lau

(57) ABSTRACT

A multi-dimensional image rendering device for displaying multi-dimensional images by layering 2D physical pixel configurations featuring a plurality of tubes in a tank, the inner cavities of the tubes are each filled with a liquid medium such that an air pocket is disposed at the first end of each tube; displacement components slidably disposed in the inner cavity of each tube that can slide between a down position and an up position; a tube aperture disposed in each tube; and a moving means operatively connected to each displacement component functioning to systematically move the respective displacement component a fixed distance creating uniform air bubbles.

10 Claims, 5 Drawing Sheets

FIG. 3A
FIG. 3B
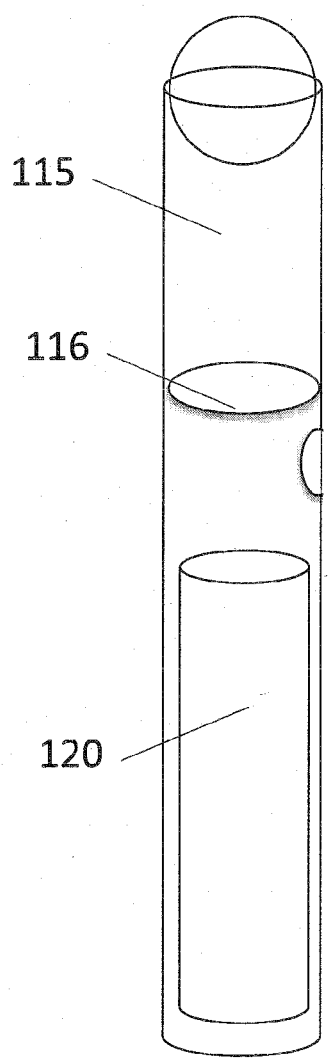
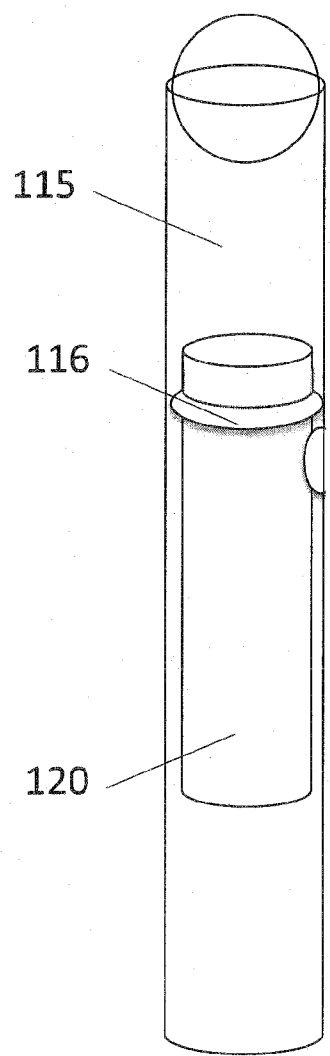

FIG. 3C
FIG. 3D
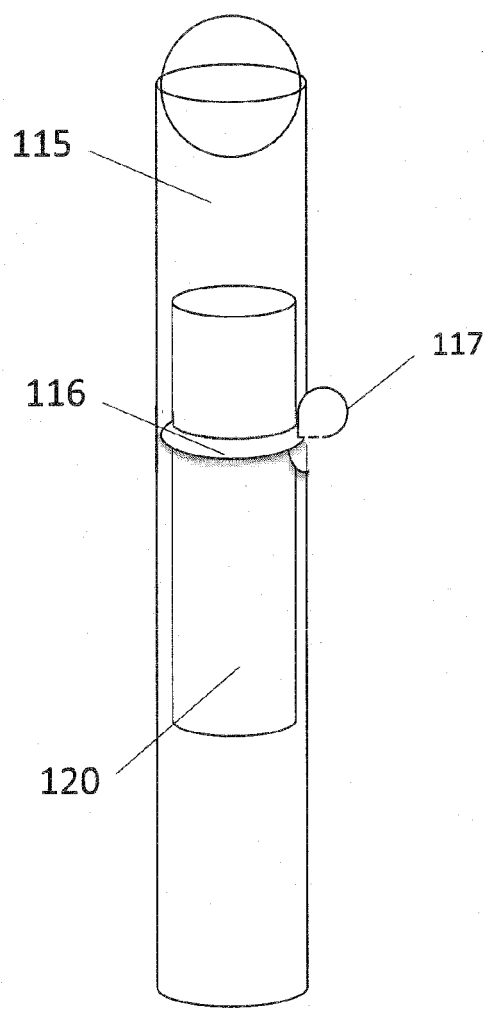
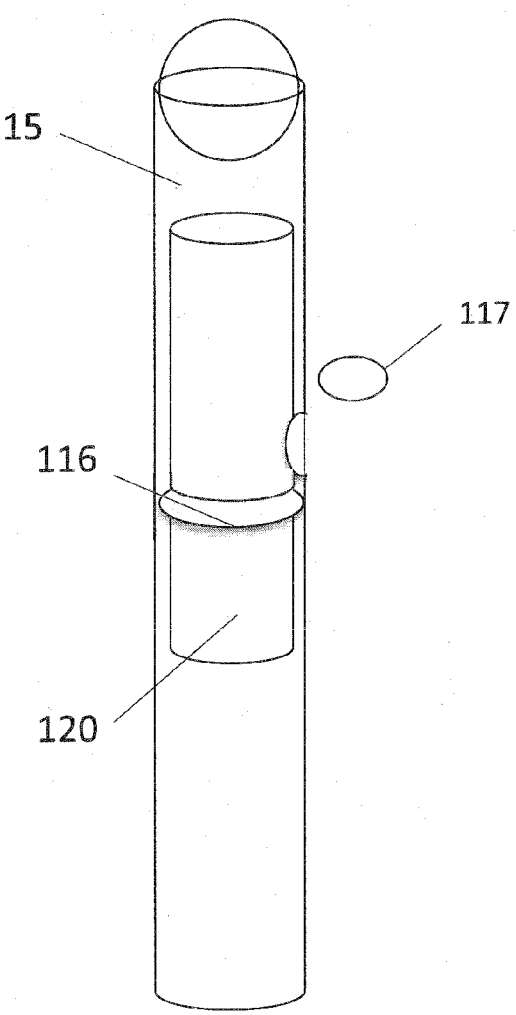

MULTI-DIMENSIONAL IMAGE RENDERING DEVICE

CROSS REFERENCE

This application claims priority to U.S. provisional application Ser. No. 61/241,542 filed Sep. 11, 2009, the specification of which is incorporated herein by reference in its entirety.

FIELD OF THE INVENTION

The present invention is directed to a system for creating and displaying multi-dimensional images, more particularly to three-dimensional images.

BACKGROUND OF THE INVENTION

Images are most commonly displayed in two-dimensional images, for example in photographs and televisions. Some devices can create illusions of three-dimensional images, however these are not true three-dimensional images. The present invention features a multi-dimensional image rendering device for creating and displaying multi-dimensional (e.g., 3D) images. For example, the device can incrementally render discrete layers of arranged graphic elements (e.g., "pixels"), the layers collectively forming and displaying a resulting multi-dimensional image (e.g., from pre-defined data). The device of the present invention may provide a tool for individuals (e.g., office workers, teachers, students, etc.) who teach and/or learn concepts such as layered images. The device of the present invention may also function as a novelty display or a piece of artwork.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3A-FIG. 3D are schematic views of a displacement component of the present invention moving between the down position and the up position in the tube.

DESCRIPTION OF PREFERRED EMBODIMENTS

Referring now to FIGS. 1-5, the present invention features a multi-dimensional image rendering device 100 for creating and displaying multi-dimensional (e.g., 3D) images. The device 100 of the present invention employs a mechanism wherein two dimensional physical pixel configurations are layered/stacked rendering three dimensional images.

Tubes

Figure 3:
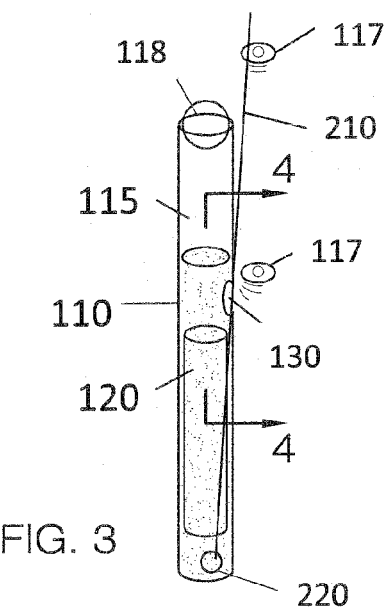
FIG. 3 is a perspective view of a tube of the multi-dimensional image rendering device of the present invention.
Figure 4:
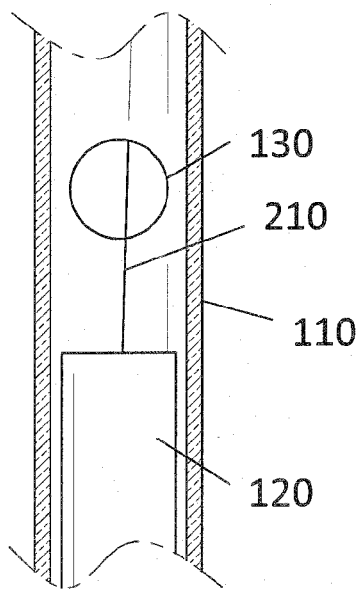
FIG. 4 is a side cross sectional view of the tube of FIG. 3.
Figure 5:
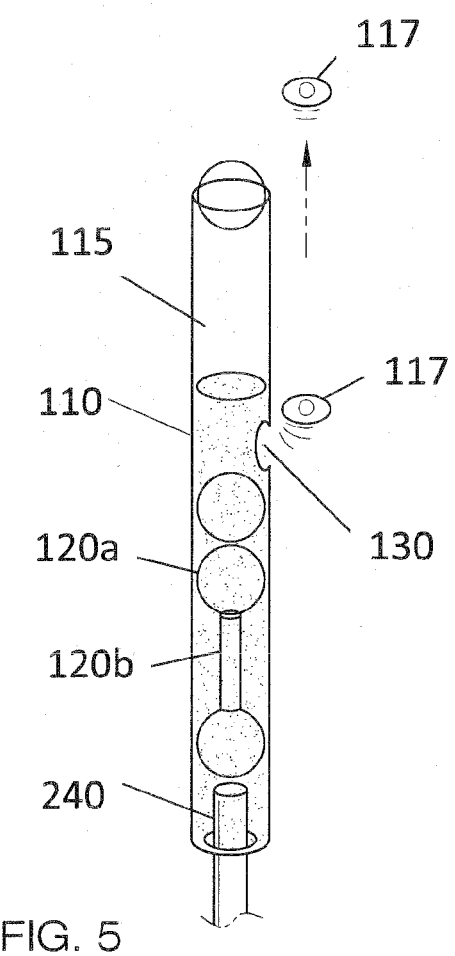
FIG. 5 is a perspective view of an alternative embodiment of the tube of the multi-dimensional image rendering device of the present invention. The solid spheres for displacing units of air is an alternative embodiment (e.g., not necessarily part of a mainstream design as it may be less practical to configure).

Referring now to FIG. 3, FIG. 4, and FIG. 5, the device 100 of the present invention comprises a plurality of tubes 110. The tube 110 has a first end and a second end and may be generally hollow with an inner cavity. In some embodiments, the first end and the second end are closed (e.g., capped). For example, a cap 118 may be removably attached to the first end of the tube 110.

Slidably disposed in the inner cavity of the tube 110 is a displacement component 120 that can slide up and down in the tube 110 (e.g., between the first end and the second end of the tube 110). The displacement component 120 can move between multiple positions including but not limited to a down position (e.g., positioned near the second end of the tube 110) and an up position (e.g., moved upwardly toward the first end of the tube 110). In some embodiments, a moving mechanism moves the displacement component 120 between the up position (e.g., FIG. 3D) and down position (e.g., FIG. 3A). In some embodiments, the displacement component 120 is biased in the down position. In some embodiments, the displacement component 120 is biased in the up position.

In some embodiments, the displacement component 120 is a shaft, a tube, or a piston. In some embodiments, the displacement component 120 is a sphere or one or more spheres 120a, shafts, tubes, pistons, spacers 120b, the like, or a combination thereof (e.g., see FIG. 5). The displacement component 120 is not limited to the aforementioned examples.

Disposed in the tube 110 is a tube aperture 130, providing access to the inner cavity of the tube 110. In some embodiments, the tube aperture 130 is positioned near the first end of the tube 110 (e.g., the first end being the top end). Generally, the tube aperture 130 is positioned below a top edge of the liquid medium (e.g., water) when the displacement component 120 is in the down position (see FIG. 3) and above the top edge of the liquid medium when the displacement component is in the up position (see FIG. 3D).

The inner cavity of the tube 110 may be filled with a liquid medium, for example the liquid medium comprises water, oil, the like, or a combination thereof. The tube 110 is filled such that an air pocket 115 is disposed in the inner cavity of the tube 110 at the first end (e.g., top end), for example see FIG. 3 and FIG. 5. The tube 110 is generally housed in a tank 310, the tank 310 being filled with a liquid medium (e.g., water, oil, the like, or a combination thereof).

Referring now to FIGS. 3A-3D, uniform (e.g., as opposed to random/arbitrary) air bubbles can be deterministically created when the displacement component 120 is moved a fixed distance between the down position and the up position. The air bubbles are uniform so as to create determined patterns. FIG. 3A shows the down position wherein the displacement component 120 is positioned near the second end (e.g., bottom end) of the tube 110. The air pocket 115 is above the liquid line 116, and the tube aperture 130 and the displacement component 120 are both below the liquid line 116. As the displacement component 120 is moved upwardly (e.g., via the movement mechanism), the liquid line 116 drops (see FIG. 3B). When the displacement component 120 is moved upwardly further, the liquid line 116 reaches the tube aperture 130 and an air bubble 117 begins to form (see FIG. 3C). When the displacement component 120 is moved upwardly further again (e.g., in the up position), the air bubble 117 is released from the tube aperture 130. The displacement component 120 can be moved back to the down position to repeat the process (see FIG. 3, FIG. 5). This is generally a requirement to replenish the air in the tube prior to repeating the process (e.g., either forced via air pump, other mechanism, see below regarding the air pump). The means in which the water is displaced by the movement of the displacement component 120 is a mechanism well known to one of ordinary skill in the art.

Moving Means

The displacement component 120 is moved via a moving means. In some embodiments, the moving means is a line 210 (e.g., similar to a fishing line). The line 210 has a first end attached to the displacement component 120 and a second end. In some embodiments, the line 210 extends through a line aperture 220 disposed in the tube 110, for example at or near the second end of the tube 110 (bottom end of the tube 110) as shown in FIG. 3. In some embodiments, the line 210 extends through the tube aperture 130 disposed in the tube 110, for example as shown in FIG. 4. The second end of the line 210 may be free or attached to an object of some kind.

Referring now to FIG. 5, in some embodiments, the moving means 210 is a piston 240 (e.g. pushing rod) operatively connected to a mechanical mechanism (e.g., a hydraulic mechanism, an air pressure mechanism, the like). Pistons and such mechanical mechanisms of movement are well known to one of ordinary skill in the art.

Figure 1:
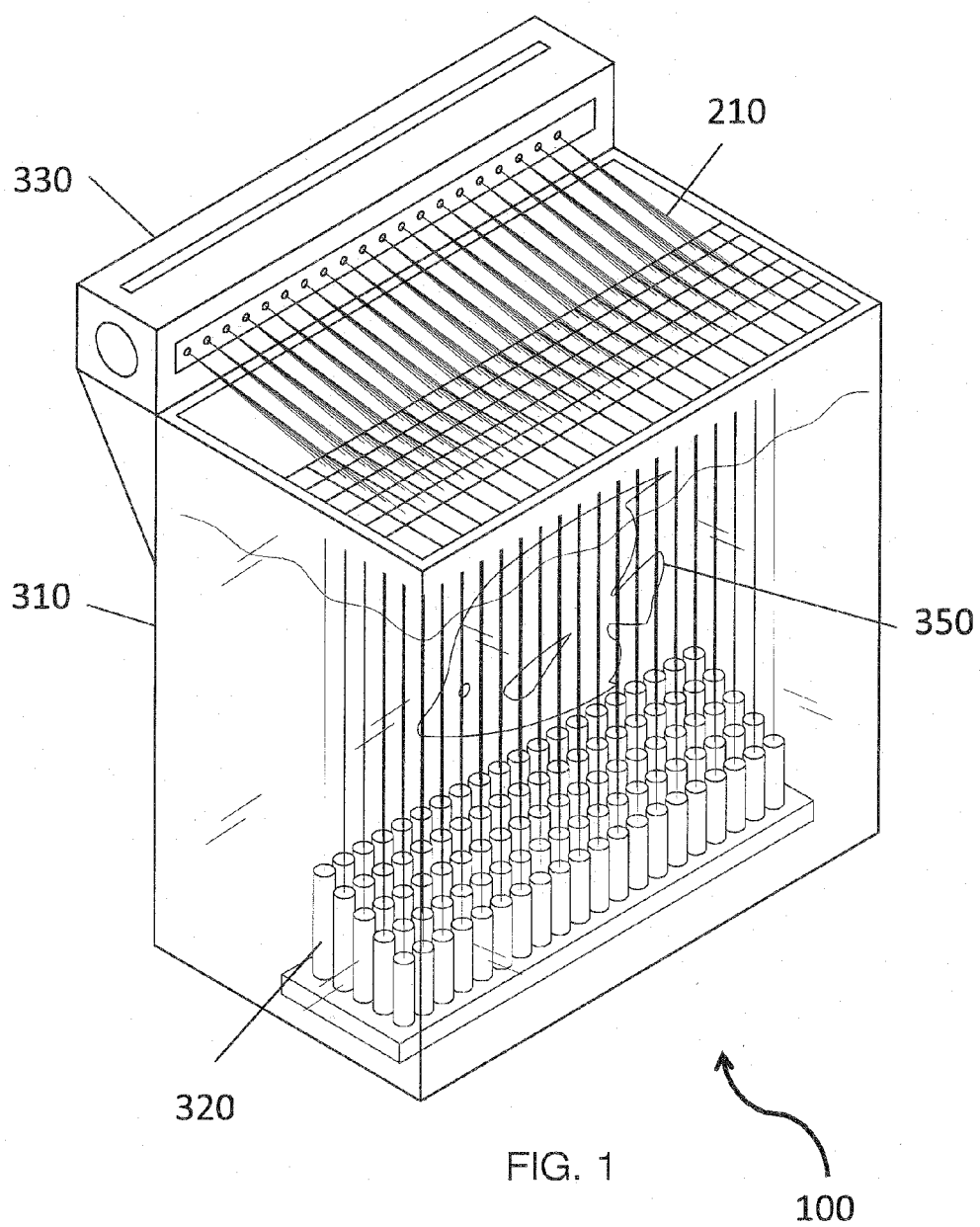
FIG. 1 is a perspective view of a multi-dimensional image rendering device of the present invention.
Figure 2:
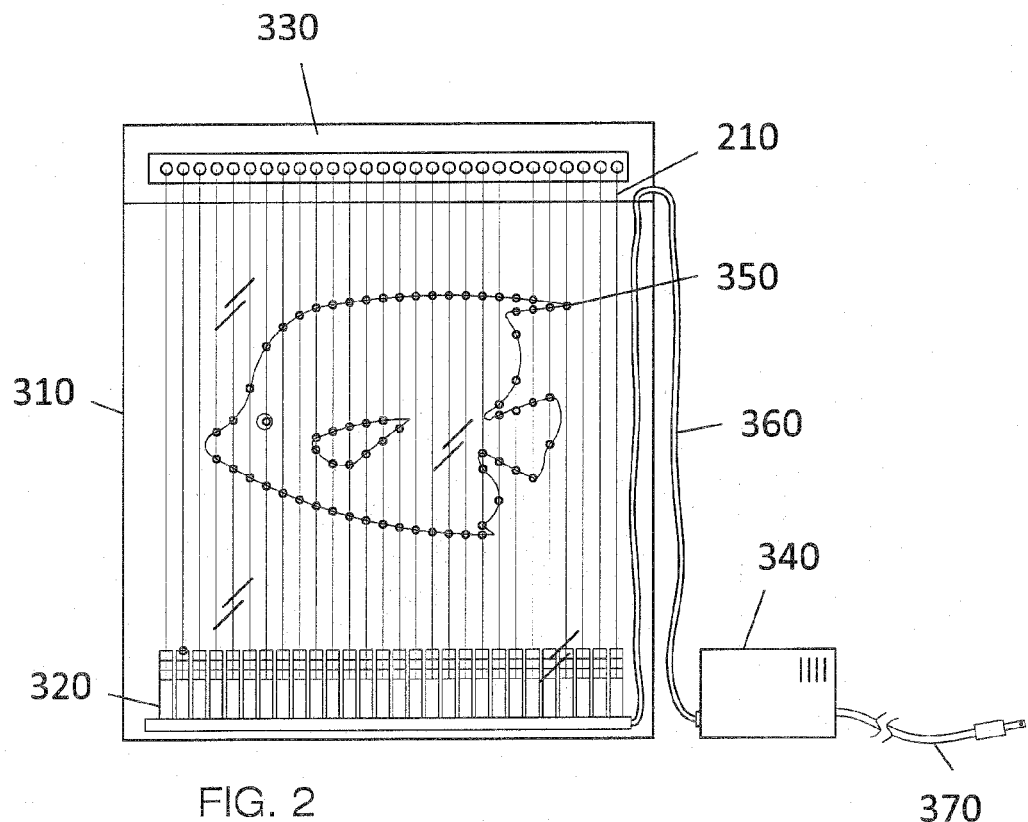
FIG. 2 is a front view of the multi-dimensional image rendering device of FIG. 1.

The moving means may be manipulated manually (e.g., by hand) or automatically (e.g., programmed, for example on a computer system). Manipulation of the moving means can be coordinated such that air bubbles are released to form a specific three-dimensional image 350 (e.g., a fish as shown in FIG. 1 and FIG. 2). For example, a coordinated (e.g., synchronized) rendering/generation of air bubbles for each flat 2-dimentional layer and for all 3-dimentional layers collectively must be managed by these mechanisms. In some embodiments, the lines 210 are connected to an interface 330, wherein the lines 210 are each operatively connected to a mechanical component designed to move the respective line 210. The mechanical component may be operatively connected to a microprocessor, which may be pre-programmed to create various three-dimensional images with the air bubbles.

Tank

Referring now to FIG. 1 and FIG. 2, in some embodiments, a tank 310 houses a plurality of tubes 110. The tubes 110 may be generally positioned in the inner cavity of the tank 310 at or near the bottom surface. In some embodiments, the tubes 110 are arranged and held in a grid component 320 disposed at or near the bottom surface of the tank 310 (see FIG. 1).

The tank 310 may be constructed in a variety of sizes and from a variety of materials. For example, in some embodiments, the tank 310 is between about 12 to 18 inches in length. In some embodiments, the tank 310 is between about 18 to 24 inches in length. In some embodiments, the tank 310 is less than about 12 inches or more than about 24 inches in length.

In some embodiments, the device 100 of the present invention comprises an air pump 340 and hose 360 operatively connected to the moving means. In some embodiments, the air pump 240 is operatively connected to a power source (e.g., via a power cord 370).

The following are examples of devices (or components of devices) of the present invention. The present invention is in no way limited to these examples. For example, Example 2 describes an embodiment wherein operation of the device is manual, however the present invention is not limited to manual operation.

EXAMPLE 1

Various Stored Image Definitions

Image definition (each distinct 2-dimensional image layer): an input data grid is fed through a Data-Reader device, which detects the specified data for each distinct image layer, processing one layer at a time, Detection of specified data points may corresponding levers to pivot, which in turn activates relevant gears on a Line-Feed Chassis device (e.g., advancing those gears). The 3-dimensional physical images are comprised of series of 2-dimensional layers.

In some embodiments, the lines 210 are attached to gears and are pulled laterally a fixed distance, upward from the display device "air chamber grid" assembly. Displacement components connected to the lines 210 are raised upwardly accordingly to displace a unit of air (air bubble 117) through the tube aperture 130. Uniform air bubbles are displaced into the water medium—simultaneously processing all pixel points for an entire layer of the image (then subsequent layers are processed). The horizontally-oriented layers of air bubbles (e.g., pixel object layers), float upwardly in parallel, collectively forming the three-dimensional image 350. Horizontal layers are spaced accordingly (generated in relatively fast succession) to accommodate the rate at which the transitory 3D image layers will float upwardly.

A pixel object dispenser device may arrange individual rows or layers of pixel objects. For example, one row at a time simultaneously dispenses pixel objects for a row or one layer at a time simultaneously dispenses pixel objects for a layer. A layer building device (e.g., layer alignment grid" may position rows/layers, advancing to subsequent layers. In some embodiments, after each layer of pixel objects is arranged, it positions completed layers. It may assemble all layers for display of the 3D image 350. A driver may coordinate rendering of image layers. The driver may comprise microprocessors for operation and data management as well as coordination of components.

EXAMPLE 2

Embedded Image Definition

The display device handle is pushed moving the connected air chambers downwardly (submerging the display apparatus) progressively lower in the water display medium. A preset configuration of solid spheres move into the air pockets 117 to displace air bubbles via the tube apertures 130 (for the entire layer). As the air chambers travel downwardly, consecutive/parallel layers of air bubbles (e.g., pixel objects) are displaced in the water medium, forming the horizontally-arranged layers of the 3D image display.

EXAMPLE 3

Synchronized in-Line Mechanical Lever Device

The lever device facilitates coordinating the simultaneous manipulation of multiple independent mechanical levers (e.g., all aligned in a straight row) to achieve specific patterns, combinations, and sequences of lever positions and motion. It may provide a substantial force of leverage to reposition multiple levers concurrently, employing a single fundamental mechanical action.

In some embodiments, activated levers are set (e.g., moved into position where they can be engaged) and a lever synchronization lift arm is pivoted forward to engage all of the activated hinged-levers concurrently pitching forward the activated levers. The lift arm makes contact with only the activated levers.

In some embodiments, each element contains an electromagnet, piston, hinged lever, and wiring. When activated, the electromagnet rises slightly, pushing upwardly the pivoting lever.

EXAMPLE 4

Additional Description

Without wishing to limit the present invention to any theory or mechanism, example 4 describes additional descriptions. The present invention features devices to display specified images that occupy three physical dimensions of space, (e.g., "3D" images). Each rendered image consists of multiple discrete layers of organized graphic pixels. Each layer is a 2-dimensional ("2D") cross-section of the image, managed as an array (rows & columns) of pixel points, where a series of physical pixel objects will be positioned. Each layer has thickness, and the combined layers cumulatively give height, width & depth to the displayed image.

Each pixel point is a distinct physical location within a 3D image, (e.g., the place representing where a potential pixel object will be positioned). Each pixel object is a discernable, relatively small physical object (e.g. spherical), occupying a pixel point. All pixel objects for an image are uniform: of the same composition, having similar visual appearance, size and shape. Pixel objects consist of visually opaque or perceptible matter (e.g., air bubbles) providing visual contrast in the display medium.

The multiple layers of pixel objects are rendered either consecutively (by row, or layer at a time), or simultaneously. The layers are positioned in parallel and suspended in place (in an applicable physical display medium or structure). The aggregate presentation of all pixels (on all layers) collectively forms the 3D image display, observable from a panoramic range of viewing angles. The effect is a tangible 3D formation.

Image Definition: In some embodiments, each 'image' is represented by a set of stored binary data defining each pixel point, each associated with a particular image layer. In some embodiments, each pixel location is specified as a Boolean value, either: OFF or ON, (stored as: 0 or 1). In some embodiments, image data is managed as a set of rows & columns, defining the 2-dimensions of each layer.

Data retrieval: In some embodiments, upon invocation, the stored data for the selected image is retrieved, interpreted, and processed for one image layer at a time. In some embodiments, when each 'pixel object' specification is detected (indicated by the stored value "ON", or 1), a relevant signal is sent, invoking the layer-building device to render the pixel objects, at the targeted image locations.

Pixel positioning: in some embodiments, the mechanisms of the device manage the configuration of pixels for each layer (as specified, transmitted from the "reader device"), by dispensing & arranging pixel objects at their respective locations for all rows, on each individual image layer.

Image assembly: In some embodiments, when all pixels on a single layer have been arranged, the completed image layer is moved into place, e.g., in the display medium, or structure. In some embodiments, subsequent layers are positioned in parallel (e.g., with suitable spacing), rendered next to each prior layer.

Driver: In some embodiments, a driving mechanism advances processing for each consecutive layer, for example controlling the functions and coordinates sequences of all components for the generation and display of all cumulative layers, rendering the 3D image display. Variations of this model are possible.

In some embodiments, the device comprises a water display medium rendering multiple layers of physical pixel objects to display transient 3D images. Variations may include air bubbles (floating pixel objects: uniform, discrete units of air) and buoyant spheres (floating pixel objects: hollow, buoyant material). Components may include a display device (e.g., water container, aquarium, modified); external air pump; pixel object dispenser (grid) to generate individual layers of displayed image; driver (automated program execution, image database management); processing (accesses stored data, interprets the specified image coordinates for each layer, coordinates the pixel object dispenser (component) to render each layer of image display); and a user interface for operation & data management (define, store, select image for display, configured as either an embedded processor, or an external personal computer interface). Consecutive layers of buoyant pixel objects are generated from the "dispenser grid." Pixel objects (bubbles, spheres) float upward. Collective layers form the 3D image display.

In some embodiments, the device comprises a platform display (various stored image definitions, manual operation). Image Definition: an "input data grid" is fed through the Data-Reader device, which detects the specified data, for each distinct image layer—processing 1 layer at a time. Detection of specified data points cause corresponding levers to pivot, which in turn activates relevant gears on the Line-Feed Chassis device, (advancing those gears). Lines attached to the respective gears are pulled laterally a fixed-distance, upward from the Display Device "air-chamber grid" assembly, (containing trapped "air pockets"). Air chamber "pistons" connected to these lines—are raised upward accordingly, to displace a unit of air, through an aperture in each air chamber, (forming an air bubble). Uniform air bubbles are displaced into the water medium—simultaneously processing all pixel points for an entire layer of the image, (then subsequent layers are processed). The horizontally-oriented layers of air bubbles, (i.e. pixel object layers), float upward in parallel—collectively forming the 3D image display. Horizontal layers are spaced accordingly (generated in relatively fast succession), to accommodate the rate at which the transitory 3D image layers will float upward.

In some embodiments, the device comprises desktop display (fixed data, embedded image definition, manual operation, hardcoded configuration/image definition). The display device "handle" is pushed: moving downward the connected air-chambers, (submerging the display apparatus), progressively lower in the water display medium. A preset configuration of solid spheres move into the upper air-chambers (air pockets), to displace uniform air-bubbles, via apertures in each air-chamber (for the entire layer). As the air-chambers travel downward, consecutive parallel layers of air-bubbles (i.e. pixel objects) are displaced into the water medium, forming the horizontally-arranged layers of the 3D image display.

In some embodiments, the device comprises vertical columns (rods, conduit, automated). Display device: Pixel object layers suspended on translucent vertical rods (conduit, or taut lines). Pixel Object Dispenser device: arranges, builds individual rows or layers of pixels objects. One Row at a time (simultaneously) dispenses/arranges all pixel objects for a row, or one Layer at a time (simultaneously) dispenses/arranges all pixel objects for a layer. Layer Building device: positions rows/layer, advances processing to subsequent layers. After each layer of pixel objects arranged—positions completed layer for display. Advances processing to next layer, assembles all layers for display of 3D image. Driver: automated processing, image database access, coordinates rendering of image layers.

In some embodiments, the device comprises vertical columns (e.g., rods, conduit). Pixel objects: constructed of suitable material, (lightweight, pliable)—to facilitate positioning & suspension on vertical conduit, rods (potentially, with a clasp/fastener, to hold at a fixed vertical position: on scored or beveled rod). Layered configuration of pixel objects, suspended in columns. Vertical Rods: (translucent, e.g. acrylic material) to support weight of suspended pixel objects—in vertical columns. Scored (indentations), to maintain pixel object vertical hold. Matrix of vertical rods (conduit, or taut line): reinforced, or weighted at bottom to ensure vertical alignment, structural integrity. Vertical configuration of columns: aligned through a grid of squares, both at top & bottom; display structure grid: approximately 20×20 vertical display columns. Display Structure: rigid frame, to support columns/lines, [and support all components]. "Mechanical Lever" apparatus: a sub-component of the "Pixel Object Dispenser (Grid)" device. Driver: (program execution, image data management) See "Automated Components", below. Processing: accesses stored data (interprets the specified image coordinates for each layer). Database, file system: data is referenced by image ID, layer, and row identification. Image data is stored as a collection of bitmaps, rows of binary values: (1's and 0's). Coordinates the pixel object dispenser (and other components), to render all image layers. User Interface: for operation & data management (define, store, select image for display). Computing hardware/software, configured as either: an embedded processor, —or— an external personal computer interface (controls device as peripheral device). Implementation: (potential) approach for "Vertical Columns", 3D image rendering. Approach: "Layer alignment grid": aligns, affixes pixel objects at horizontal layers of the image. Description: Stationary "pixel object dispenser" (lever control) device at top of Display structure. Image layers are constructed in upward progression, processing lowest vertical layer first. Pixel objects are dispensed from the top, (arranged for entire horizontal layer)—threaded onto the vertical conduit, descending via gravitational pull, slide downward on the conduit. Upon reaching the "layer alignment grid" (initially positioned at lowest vertical layer), individual pixel objects "pivot"—as they encounter/move through the grid, and are locked into place: fixed firmly at indentations of the vertical conduit. All pixel objects for the horizontal layer are suspended in place (concurrently), at that vertical position. The position of the "layer alignment grid" is moved upward (1 layer), then the next layer of pixel objects is dispensed, positioned (cumulatively building all layers of the 3D image).

In some embodiments, the device comprises rigid horizontal layers (automated). Display device: Pixel objects are arranged on horizontal layers, (rigid, flat, translucent surfaces). Pixel Object Dispenser device: arranges, builds individual rows or layers of pixels objects. One Row at a time: (simultaneously) dispenses/arranges all pixel objects for a row, or one Layer at a time: (simultaneously) dispenses/arranges all pixel objects for a layer. Layer Building device: positions rows/layer, advances processing to subsequent layers. After each layer of pixel objects arranged—positions completed layer for display. Advances processing to next layer, assembles all layers for display of 3D image. Driver: automated processing, image database access, coordinates rendering of image layers.

In some embodiments, the device comprises rigid horizontal layers. Pixel objects: constructed of suitable material and shape—for positioning (arrangement, suspension) on flat, horizontally-oriented rigid surfaces. Lightweight, pliable composition. Horizontal surfaces: facilitate pixel objects to be positioned & retained in fixed locations, for each row/column (on individual flat layers). Potentially constructed as: "lattice" of thin wire/composite mesh, (grid) to support layer of arranged pixel objects. Alternatively solid surface, of acrylic material—with indentations, (to hold pixels). Layers are translucent, not to obstruct/obscure display of 3D image from all viewing angles. Display Structure: rigid frame, to support horizontal surfaces, all components & apparatus. "Mechanical Lever" apparatus: a sub-component of the "Pixel Object Dispenser (Grid)" device. Driver (program execution, image data management) See "Automated Components", below. Processing: accesses stored data (interprets the specified image coordinates for each layer). Database, file system: data is referenced by image ID, layer, and row identification. Image data is stored as a collection of bitmaps, rows of binary values: (1's and 0's). Coordinates the pixel object dispenser (and other components), to render all image layers. User Interface: for operation & data management (define, store, select image for display). Computing hardware/software, configured as either: an embedded processor, —or— an external personal computer interface (controls 'MIRS' as peripheral device). Implementation potential approach for "rigid horizontal layers", 3D image rendering. Approach: "Horizontal Layer Collator" (builds/assembles, and collates cumulative image layers). Description: Stationary "pixel object dispenser" (lever control) device at top of Display structure. Image layers are built in downward direction, processing lowest vertical layer first. A single layer is fed through, processing all pixel points for the layer, (1) row at a time. Image layers are constructed, placing pixels objects for all rows of the layer. Completed layers are positioned, "stacked" downward into the Display structure. Subsequent layers are moved into position, built, and subsequently "stacked", Model is analogous to conventional "single sheet-feed, paper printer" (and collator): Each (2D) horizontal image layer is comparable to a printed sheet of paper. Layers are built by a moving carriage/dispenser mechanism (laterally, back & forth), dispensing/positioning pixel objects at fixed points—on the layer ("sheet"). The "page" is advanced forward, to dispense pixel objects ("ink") at specified rows. Completed sheets are dispensed from the printer, as layers are assembled (collated), to form the entire document—in this case, the composite multilayered 3D image.

In some embodiments, the device comprises embedded pixel objects, matrix (automated). Designed as a stationary 3D image matrix, organized as vertical columns with latent pixel objects, embedded within the structure—located at each pixel point, for potential display. Renders display of all image layers, concurrently. Enables fast, consecutive image displays. Display device: When "activated", the concealed pixel objects are "expanded", to become visibly discernable. Collectively, the pattern of all visually "expanded" pixel objects forms a 3D image. Driver: automated processing, image database access, coordinates rendering of image layers. Note: the levers are used to advance "Control lines", not used to dispense pixel objects. This design variation does NOT "dispense" physical pixel objects at specified locations. Therefore, it does not require substantial moving/positioning of components, apparatus, physical layers, or pixel objects. Instead, a stationary construct of vertical columns (and implicit horizontal layers), initially displays only the supporting structure—of an "empty" 3D matrix of columns. Each horizontal "layer" is comprised of rows & columns, of pixel points (pixel elements). Each element is a "dormant" pixel point, and contains an embedded/concealed pixel object (visual identifier)—which is initially NOT activated, and therefore not visually-prominent. When "activated", the relevant pixel points each reveal a visually-discernable pixel object. Image rendering is facilitated by a series of coordinated mechanical levers, to "activate" the Display elements, controlled by an automated program, according to pre-defined data. The mechanical "Lever Control (device)" is configured outside of the display structure. A set of coordinated "control lines" connect individual levers of the "Lever Control Device", to the corresponding pixel elements, in the vertical columns (conduit) of the 3D Display Structure. An image is managed as a configuration of horizontal layers, each a pattern of pixel points. Pixel points (i.e. "pixel elements") are located within vertical columns, initially "dormant". Each pixel element contains a configuration of "folding flaps" (closed in "resting"/default position), & vertically aligned with the orientation of each column—therefore, concealed. When a pixel point is "activated", the corresponding lever is extended—advancing the attached "control line" a fixed distance: causing the pixel element assembly to flatten, expanding outward the pixel element "flaps", spreading out into a horizontal orientation. The expanded contents of the pixel element forms a bulbous shape, (displaying a visually discernable "pixel object"—in visual contrast to the surrounding display structure). Jointly, all "activated" (expanded) pixel objects, on all layers—form a 3D image display. The flaps can maintain either a folded "dormant" (concealed) vertical configuration—or may be unfolded (spread out) to a horizontal "expanded" 3D visual orientation, to represent an "activated" pixel object (bulbous in shape, of visual contrast in the medium). The "folding flaps" of the pixel element (pixel object) are constructed of resilient material or fabric, flexible & shape-forming. May be repeatedly folded, unfolded. The expanded mechanism of each pixel element is automatically retracted after each action. Any combination of "control lines" can be concurrently activated, for any/all layers of the 3D image display, (by the "Mechanical Lever control device"). Instantaneous display: simultaneously renders ALL specified pixel objects of the entire 3D image (i.e, displays all "activated" instances of pixel points, on all layers—at once). Because the visual identifier is embedded at each pixel location, no components or objects need to be placed or moved (requires only setting fixed toggles), for the immediate display. Potentially facilitates rapid consecutive display of multiple images, (e.g. 3D "animation"). A requirement of MIRS is the ability to generate multiple consecutive specified images. To the extent that a logical progression of 3D images can be rendered consecutively, relatively seamlessly, in reasonably fast succession—the visual effect of 3D "animation" can be achieved. Activated pixel points display a visually contrasting shape & orientation in the medium. The visual appearance, collective motion & positioning of all indicators (on all layers), in contrast to the supporting vertical columns—constitutes the discernable 3D image display. The supporting columns themselves are minimally visually-invasive (of narrow width), and the structure does not visibly obscure or obstruct the view of the 3D image display. The "Mechanical Lever Control Device" itself would be visually obtrusive and ungainly to manage, if located directly within the visual display area. Therefore it is configured as an external apparatus, connected via "control lines" to elements within the Display structure. "Control Lines" are threaded through the (hollow) pixel mechanisms—& tied at the top of each element's "folding flap", (other end are connected externally to mechanical Levers). When "activated", a lever pulls the control line downward, compresses & collapses the folding pixel flaps, causing the flaps to flange outward (flattening wide, like an umbrella). Displays a visually-prominent protrusion (pixel object), orthogonal in contrast to columns. When the lever is de-activated, the pixel element resets to its default position, after display.

An interior spring maintains the extended (hidden) pixel configuration, vertically oriented (and visually concealed) within the column. "Folded. Pleated material": Handle pivots (rotates), to "unfurl" pleated material. Expands horizontally, spreads material outward. Unfolded material displays opaque, bulbous shape [analogous to unfurling a "pleated fan", or accordion]

In some embodiments, the device comprises embedded handles, obtruding (automated). When activated, concealed "handles" will obtrude—to vertically suspend pixel objects (in layers). Designed as a stationary 3D image matrix (organized as vertical columns). Pixel "handles" are embedded within the columns of the structure, (located at each layer/pixel element). Each handle (initially concealed in an "element") when activated, will obtrude [stick out] to impede a pixel object from descending further—vertically suspending it at that layer. The visually-discernable display of all pixel objects forms the multi-layer 3D image. Image layers are processed in sequence, (1 layer at a time, in an upward progression). First, (the bottom image layer is processed): The specified pattern of "activated" pixel element 'handles' on THIS layer only—are caused to pivot, and obtrude. Second: specified pixel objects arranged for that layer are "dispensed" from the top: (hollow-center, opaque "beads", threaded over the columns) slide downward, per gravitational force, [unobstructed from descending past the concealed handles]. Third: pixel objects are impeded from falling at the specified layer, only stopped when encountering an "activated" obtruding handle—suspending each pixel object at that vertical level, (for the entire horizontal layer of arranged pixel objects). Fourth: consecutive (upward) layers of specified pixel objects are processed. The collective display of arranged pixel objects (on all layers) forms the 3D image. "Control lines" threaded through the columns—attached to each handle, and the other end attached to the synchronized lever control device, effect the pivoting action of each handle. A separate coordinated mechanism dispenses pixel objects from top of display structure. Optimization (for variations: E1, E2): "electromagnets" embedded directly in columns (elements), to effect the automatic/synchronized positioning of all "handles" (and/or pixel object rendering). Driver: automated processing, image database access, coordinates rendering of image layers.

In some embodiments, the device comprises cylindrical display configuration (automated). Multiple translucent circular horizontal/parallel layers (comprising a 3D cylindrical configuration). Each layer represents multiple concentric circular patterns of pixel points. The aggregate arranged pixel objects on all circular layers—form a 3D image display. Specified pixel objects are positioned on each horizontal circular layer (concurrently), via a vertically-oriented pixel object dispenser grid, rotating around a fixed central axis. The cylindrical 3D image display structure (and circular layer configuration) Effectively facilitates iterative rendering of (consecutive) multi-layered 3D image displays. Enables rotating lever grid to "toggle" on/off display of specified pixel points, at each layer: pixel objects may be displayable toggle switches, rather than separate positioned objects. Offers a broad range of viewing angles, for multidimensional image display. Image data layout: (per layer) may be managed as either rows & columns, or as a group of concentric circular patterns of pixel points, (mapped accordingly for data storage). Driver: (automated program execution, image database management). Processing: accesses stored data (interprets the specified image coordinates for each layer). Coordinates the pixel object dispenser (component) to render each layer of image display. User Interface: for operation & data management (define, store, select image for display). Configured as either an embedded processor, or an external personal computer interface.

In some embodiments, the device comprises spherical display configuration, rotating (automated). Multiple translucent circular horizontal/parallel layers (comprising a 3D spherical configuration). Each layer represents multiple concentric circular patterns of pixel points. The cumulative arranged pixel objects on all circular layers—form a 3D image display. Specified pixel objects are positioned on each circular layer (concurrently), via a stationary (semi-circular) vertically-oriented pixel object dispenser grid, while the display structure itself rotates around a fixed central axis. The spherical 3D image display structure (and circular layer configuration): effectively facilitates iterative rendering of (consecutive) multi-layered 3D image displays. Enables fixed lever grid to "toggle" on/off display of specified pixel points, at each layer: pixel objects may be displayable toggle switches, rather than separate positioned objects. Offers a broad range of viewing angles, for multidimensional image display. Image data layout: (per layer) managed as concentric circular patterns of pixel points, in database.

In some embodiments, the device comprises encoded, specialized "Pixel Display Objects" (automated). Specialized attributes and features of individual "pixel display objects" enable their physical positioning, and help facilitate the rendering of multiple layers (of pixel objects), for the display of physical 3D images. Implementations may take advantage of selective processing, encoding, or specialized features of "pixel display objects", to assist in manipulating extensive image data content—rather than relying solely on structural mechanisms to maneuver numerous identical (homogeneous) pixel objects. Specialized pixel objects may possess, or may be assigned (encoded) with a particular physical or electronic property, attribute or characteristic—that cause it to be positioned & affixed at a specific location of an image layer, as coordinated within a relevant display structure. The "Driver" program coordinates mechanisms of either/both the display structure & display data (i.e. specialized "pixel objects"), to accomplish the physical arrangement of potentially numerous pixel objects, and the synchronized positioning of (many) image layers. Specialized pixel objects (i.e. "pixel display objects") may be: Customizable (i.e. configured at the time of dispensing, activating, or rendering). Distinctly grouped, sorted and dispensed (according to their preset various attributes). Autonomous (have embedded mechanism, to enable positioning/affixing at a location). Examples: (specialized "pixel display objects", and corresponding display structures) Features & mechanisms to automatically position and/or affix pixel objects at specified positions: Physical: size or shape of pixel objects can be utilized within the context of a coordinated display structure, to determine the physical positioning of pixel objects (as well as cause the objects to adhere at that particular position). Electromechanical: low-power antenna, emits radio frequency to "lock" an entire layer of arranged pixel objects at current position, via embedded electromagnets (or "unlocks" multiple layers of pixel objects, for an entire image). Analogous to the "shopping cart (anti-theft) wheel-locking" mechanism, which can stop & "lock" a cart at fixed position. Potential application: micro-encoding, embedded as "indicators", for instrumentation, and collective processing of numerous pixel "display objects". Embedded in display structure elements, or within the individual pixel object instances, (i.e. encoded in "display data"). Enhancement: additional attributes, properties for managing pixel "display objects" can be incorporated into refined applications (e.g. shape, size, color, function, or increased utility).

In some embodiments, the device comprises a kit/model for building (manual-or-automated). Note: the "Kit"/"Model building" variations may be comprised of either/both: Manually operated components or Automated components. Classroom: (teaching/learning exercises) demonstrates various concepts both for building, demonstrating, and using components of the device of the present invention. Encapsulated as a kit, model, and as a teaching vehicle. Students participate to build and use, as a means for learning. Hobbyists: "working model-building kit". Any of the primary "Design Variations" could be packaged as a "model-building (kit)" A subset of components packaged as transparent, "open-architecture", to promote understanding of the mechanisms, abstract concepts and practical uses. One or more components can be built, or customized/extended. Other components can be fully operational, i.e. ready to use ("out-of-box"). In particular, the components of prototype "(P1) Design Variation": demonstrate concepts of science, computers, math and other areas of study. Components are constructed from common materials. Requires manual construction, operation, and data definition. Other variations (or combinations of manual/automated components) may be equally well-suited for this particular application, i.e. for a "model-building (kit)".

Components, Variations

Mechanical LEVER Control Device (automated, for interface with automated components). A configuration of mechanical levers, to facilitate the automated arrangement of pixel objects in rows and columns. Enables building individual image layers (1 layer at a time), according to predefined data. Provides for dispensing, arranging, and positioning of elements & rows of pixel objects. HARDWARE Description: An electromechanical peripheral device, for interface with [external] computing device. Driven by computing hardware/software (i.e. a "Device Driver" program). A set of mechanical levers that can be individually controlled, per specified program data. Constructed as a series of "lever elements", each individual element implemented as either: a Solenoid [mounted in each element with a corresponding hinged-lever], or an Electromagnet [mechanism for particular applications]. Configured as a grid of mechanical levers: individual levers can be selectively positioned (either "up" or "down", relative to the absolute orientation of the lever implementation). Each lever can be specified to rapidly change position. To generate comprehensive combinations, patterns, and repeatable sequences of motion. Facilitates automation of mechanical applications: produces a coordinated series of motion (as specified) for a grouping of mechanical levers, sequences of discernable movements. Construction and action of each lever is uniform (identical). Each lever has a single function & basic motion: positioned either "Up" or "Down". When activated, moves to the "Up" position, then (optionally) returns to the default "Down" position, (analogous to the mechanics of automated hammers in a "player piano"). The primary configurations for this component design are: [but not necessarily limited to] Element: single instance of a mechanical lever assembly, (mounted on relevant physical structure/housing, with required hardware, wiring, and casing). Row: a linear configuration (straight file of several elements), each containing a lever. (2D) Grid: a rectangular pattern (e.g. layer), multiple rows & columns of lever elements. (3D) Matrix of grids (e.g. multiple layers of rows/columns, of lever elements). A typical "row" configuration could have between 10-40 (lever assembly) elements, or more. Mechanical LEVER Control Device: (implementation, configurations) MOTION: provides "hinged" action, of individual moving levers.

Mechanical PISTON Control Device (automated, variation). MOTION: 'Pistons' provides slightly different action (than 'Levers'), straight up-down motion of individual pistons, potentially for the same purpose, providing SIMILAR functionality.

GENERALIZED design: (potential value in reusability, specialization). The "Mechanical Lever [or Piston] Control Device" component is considered a generic model, i.e. a reusable design—to interact with other (disparate) components, as a mechanical "interface". Such a device may be utilized to accomplish a variety of coordinated mechanical tasks, via the specified sequencing of multiple levers (or pistons). The composite design may be specialized to accommodate [other] particular applications. This particular component serves only to help facilitate building each individual image layer, by dispensing, and/or positioning (arranging) pixel objects—for a single row or layer. It does NOT necessarily assist with, or accomplish positioning (or "rendering") completed arranged layers—nor perform any other manipulation or moving of a physical "layer" into place: either before, during, or after "arranging" pixel objects for individual rows. Construction: the physical "Mechanical Lever Control Device" GRID (or ROW) assembly consists of plastic or metal housing, configured as a row(s) of square elements, each fitted with an electronic powered solenoid or electromagnet (lever, piston mechanism), and appropriate wiring. Device "elements" (i.e. lever, piston assemblies) are generally "small", [relative to the overall image display size] to minimize overhead for managing a greater number of levers, for optimal granularity, graphic resolution (image pixel density), greatest range of utility and aesthetic value. The particular SIZE of the element housing, piston or lever, depends on the actual materials for the MIRS production environment, (and specific display medium, display structure implemented). The device requires a relatively low level of force/range of motion (for individual elements), and therefore can be relatively small in overall dimensions—and driven by individual electronic and mechanical components of relatively low end capacity. Some applications of the "Mechanical Lever Control Device" may require a scale of potentially many instances of elements (rows & columns), for concurrent processing comprehensive graphics. Each individual element of the device (lever, piston) provides these capabilities: Automated, specified motion & positioning of each lever (or piston) independently. Consistent, discernable range of motion (upward or downward). Discernable resting position, or "activated" position (either: "down" or "up"). Adequate force: motion of lever/piston. Adequate speed: (to position/re-position, quickly). Repeatable motion: ability to repeatedly reposition the same element, explicitly. Optional ability to automatically re-position the element, subsequently: (either) Leave the element (lever/piston) in current position, after an action, —or— Return the element to (its prior) position, immediately after an action. —or— Return element to a (default) position: immediately after action. ROW, GRID: a collective row/layer (grid) of multiple elements—provides these capabilities: Ability to dynamically manipulate the position of multiple lever/piston elements, in a linear ROW simultaneously—to enable consecutive sequences of motion, and positioning. Linear ROWS of elements can be positioned in any various binary patterns (up or down). Uniform movement across all elements: consistent, discernable range of motion, (upward or downward), inclusive of consistent: speed, timing, exerted force, etc. A single controller program (and power source), can drive an entire ROW mechanism. Ability to synchronize an entire LAYER: multiple ROWS/columns (of levers, pistons). The entire device is driven automatically by an external controller program—to coordinate sequences and patterns of pixel display, (per stored data specifications). RESETTING the LEVER Position: (and "retracting" the piston)

Gravity serves as an opposing force of resistance—to reset the lever/piston to default position, as the solenoid is retracted. If required for speed or force of retraction, additional resistance can be achieved, by applying: extra weight, spring mechanism, (or fastened to the retracting mechanism). IMPLEMENTATION variation: "Lever" Element assembly (hardware). The pivoting "LEVER" mechanism may be a combined assembly of both piston & hinged-lever. The upward motion of the piston (encountering the lever), causes the "activated" hinged-lever to pivot upward the full range.

Synchronized "In-Line" Mechanical Lever device (variation, automated). Note: Functional requirements and capabilities are IDENTICAL to "Mechanical Lever Control" device variations (above), utilizing a different implementation. Facilitates coordinating the simultaneous manipulation of multiple independent mechanical levers (all aligned in a straight row), to achieve specified patterns, combinations, & sequences of lever positions & motion. Provides a substantial force of leverage—to reposition multiple levers concurrently, employing a single fundamental mechanical action. "In-Line" Lever assembly (variation description). Rather than each lever element pivoting individually (via an independent mechanical or electromagnetic mechanism), the aggregate grouping of ACTIVATED levers, in each "in-line lever assembly" are pivoted together, simultaneously (in a single mechanical action). First, "activated" levers are set (moved into position, where they can be engaged). Second, a lever synchronization "lift-arm" is pivoted forward to engage ALL of the "activated" hinged-levers, concurrently pitching forward the activated levers. Lift-arm makes contact with only the "activated" levers, (others will fall below trajectory). Engages multiple levers, concurrently. Effectively makes contact with potentially any combination, or ALL levers of the "in-line lever" (row) assembly. Provides a (more) substantial, sustained force for activated levers—than achieved with the implementation of a separate electromagnet (or solenoid) for each individual lever element.

Synchronized "In-Line" Mechanical Lever device. Lift-Arm apparatus: The "Lift-Arm" is set in motion (pivoted) with a pulley-wheel, which exerts adequate force to raise upward (forward) any combination of "activated" levers, for the in-line assembly. When engaged by the lever "lift-arm", a substantial uniform force is applied to each lever. Lever Element, mechanism: (specification, mechanical requirements, construction). Individual levers are mounted in the "in-line" assembly, each as a physical element. Each element of the assembly contains an electromagnet, piston, hinged lever, and wiring. When activated, the electromagnet rises slightly, pushing (upward) the pivoting lever. Shifting an activated lever slightly upward to its "initial position", to be engaged—is a (relatively) lightweight mechanical task, which requires only a low-force electromagnet. Once levers are "set in position" (to be engaged), the lever "synchronization Lift-Arm" applies a significant force of leverage, to pivot all "activated" levers forward (transferring that force, distributed to individual levers). Retract, reset: (individual elements, collective assembly). After the synchronized action is performed (pivoting forward all activated "in-line" levers), the lift-arm is retracted—returning (dropping back) to its default, resting position. Similarly, all pistons & levers are retracted, (returning to default, resting position). The solenoid, electromagnet assembly are fully retracted, (to default position) after the collective lever actions for the in-line assembly have been executed. Lift-arm (optionally) remains in resting position, for rows where no elements are activated, Construction: (Lift-Arm) The directed mechanical force to pivot the "lift-arm" is applied near the linear "middle" of the collective row of elements ("in-line" assembly), where force will be optimally distributed—and equitably applied to all levers of the in-line assembly. Alternatively, the "lift-arm" may be pivoted by applying equal force, distributed concurrently to both ends of the assembly, (or at several equidistant points along the arm). Combined assemblies: multiple (parallel) "lift-arms" can pivot together, coordinated to engage several instances of the "in-line lever" assembly concurrently, in a configuration of multiple (side-by-side) assemblies—representing a "grid" of lever elements. Driven by either a single pulley-wheel mechanism, or a synchronized set of mechanisms. Analogous to configuration of "window shutters": where a single pivot arm attached to the middle of each shutter row—facilitates pivoting all rows, with a single action. The "in-line" implementation variation is specified with consideration toward optimizing design. Effectively control the simultaneous repositioning of multiple in-line levers, by converting a specified array of binary data (i.e. a data bitmap)—directly into an equivalent physical representation of binary indicators: a corresponding configuration of arranged levers. Employ a single electromechanical (or mechanical) action to automatically establish the synchronized positioning of multiple in-line "activated" levers or pistons, (as opposed to operating independent mechanisms for each lever instance). Provide a practical, effective means for manipulating a large scale of coordinated levers. Minimize mechanical requirements & overhead—while maximize capacity/scope of levers. Enable concurrent synchronization for a large configuration of levers, utilizing a minimal amount of mechanical actions, and least number of electromechanical device instances. Concurrently render a physical representation of an extensive binary pattern—as specified, (to automatically configure positions of a large number of corresponding physical levers), with minimal requirement for number or capacity of electromechanical device instances. Utilize (require) least amount of force/energy exerted to set individual element position. Ability to quickly reposition automatically (individual & collective group of levers), to render subsequent physical configurations. Provide an entirely mechanical implementation (i.e. not electromechanical), to set initial position for multiple "in-line" lever elements. Provide for refinement and miniaturization of components, assemblies, and renderings—to facilitate broader scope of utility, and enhanced application designs. Provide for standardization in mechanical, electronic, and computerized aspects of design. Image Layer Processing, Positioning: (automated components, sub-assemblies). PRIMARY COMPONENTS to facilitate coordinated image layer "building" & rendering. High-level description, specification: (varies, depending on display medium & design variation).

"Pixel Object Dispenser" device. Dispense individual physical "pixel objects", arranged in linear rows: Affix pixel object physical position, at specified coordinate (layer, row/column). Pixel object must be suspended vertically, (in fixed position on a horizontal layer). Iteratively dispense, arrange & build specified multiple rows of pixel objects, per layer: Rows are arranged as linear formations of pixel elements (positioned in parallel), on a physical layer/structure (i.e. "2D grid": flat configuration of rows/columns). Coordinated processing using "Mechanical Lever/Piston control device" subcomponent: utilizes functional capabilities to dispense & manipulate physical positions of pixel objects. Lever/Piston action (controlled by "Driver" program, activated per specified image data): Physically sets in motion elements of the electromechanical "control device" and facilitates dispensing, access to pixel objects (from pixel object repository), and physical placement. Effectively utilize apparatus features to establish placement of pixel objects (as specified): make use of discernable actions of sub-component elements: motion, position, or force. Pivoting motion, alternating position of individual hinged-LEVER. Opposing motion, diverse range of position of "extended" or "retracted" PISTON. Alternatively, the directed force (of either levers or pistons) can be utilized to manipulate pixel object placement, (directly, or indirectly via a connected linkage). Coordinated action of multiple levers, arrange entire row of pixel objects/elements. Lever motion/position allows only a single pixel object dispensed at once, per element.

"Layer Building" device. Maneuver individual rows into position for building: "Layer Building" device, either: moves "Pixel Object Dispenser" inline with the stationary layer row location —or— moves the physical layer row location into alignment with the stationary dispenser. "Image Assembler" apparatus: (sub-component of "Layer Building" device). Moves completed image layers, into place—in the Display Structure, (after each layer is built) into position, to organize all layers for the entire 3D image display. Advances processing to next layer (moves subsequent layers into place, to be built). Implementation: apparatus of gears, pulleys: (electronic, gravitational-feed mechanism, or other). Device Driver and Image Data Management (Programmatic Automation). Computer program modules facilitate data management, operation, and automation—via either: An embedded processor (as an integrated component), —or— External personal computer interface, via USB port (controls device as peripheral device). PROGRAM INTERFACE: (for applicable components) Automated "Driver" (program) controls & coordinates functions of multiple components: Activates specified series of levers, ("Mechanical Lever Control Device"). Coordinates actions of "Pixel Object Dispenser." Drives "Layer Building Device": apparatus to advance position of physical layers. Advance layer/row position, (to align with Lever controls, pixel dispenser). Move layers into the display rendering position, (image Display structure). Assemble all layers, (in parallel) into holistic multi-layer 3D image display. Database management: (manage file system of image data). Facilitates defining, storing, and accessing data for individual images. Accesses stored image data (image definitions) for operation, modification, etc. Image data managed as rows & columns of data, corresponding directly to layered image patterns. Driver program accesses stored data: interprets image layer data, specified coordinates. Database, file system: data is referenced by image ID, layer, and row identification. Image data is stored as a collection of bitmaps, rows of binary values: (1's and 0's). USER INTERFACE: Operation: allows user to select a particular image, & initiate automated display process. Allows user to specify a sequence of multiple images for consecutive display, (optional). Allows user to specify the timing intervals for image displays, for sequences, (optional). Data management, [automated]: User can select, manage & store image data definitions. Provides User Interface to [manually] define or modify image data. IMAGE DATA REFINEMENT facilitates automatically creating, modifying or refining image data files (MIRS format). Based on conventional image data (standard formats), program assists in automating data translation, to create "coarse" MIRS image data (incorporate computational algorithms for conversion of graphical images, to be represented in MIRS image data format). Programmatic interface: for external devices that provide image data feed/real-time input.

Moving Parts: (coordinated motion—between interrelated components, primary configurations). Some components or sub-components of the structure can be fixed (stationary), others will not. Components, apparatus, or structure must be relatively positioned, to provide joint proximity for processing all pixel points, on all image layers. The variable moving parts are potentially: Pixel Object Dispenser: (to dispense specified pixel objects, per row—or entire layer), Layer Builder: (advances processing to each row, completes entire layer), Image Assembler: (advances processing to each layer, collates all layers into display), The Display Structure itself (is advanced to the location of stationary components), Stationary model (alternative): all "pixel objects" are already embedded, fixed within the Display Structure (concealed at each pixel location), where any pixel point can potentially be activated to display a "visual indicator", i.e. pixel object.

Implementation Variations: (interaction between "moving parts", components). Configurations with more extensive "grids", i.e. large number of fixed rendering "elements" (multiple rows, layers of levers/pistons), will require less substantial "moving parts", i.e. shifting around of major component assemblies. Stationary "Pixel Object Dispenser (grid)", affixed at top of Display Structure: Display apparatus (e.g. vertical columns), moves through the dispenser grid, at top. Concurrently process all pixel points for (1) entire layer at a time, (bottom layer, first). Stationary vertical columns (and implicit layers), affixed within the Display Structure: "Pixel Object Dispenser (grid)", component is moved from top to bottom. Concurrently process all pixel points for (1) entire layer at a time, (top layer, first). Stationary "Pixel Object Dispenser (grid)", affixed at back of Display Structure: ALL horizontal Layers are concurrently fed through the grid, (from the back). Simultaneously processes pixel points on each Layer (1 row at a time), front row first. Stationary "Array of Rigid Layers", affixed within the Display Structure: "Pixel Object Dispenser (grid)" is moved from front to back, concurrently processing (1) entire row of pixel points, on EACH of the stationary horizontal layers. Practical considerations: (determining the primary design variations). Assumptions: A subset of generated images may be specified to occupy ONLY (2) physical dimensions of space (e.g. for writing, characters, logos, or other 'flat' images), not necessarily (3) dimensions. Image (layer) construction: all pixel objects in a defined space, are generated & positioned either consecutively —or— concurrently (simultaneously), depending upon the implementation. "Layers" are manageable sections of an image—and may be represented, organized, and progressively rendered & displayed in ANY relative direction & spacial orientation: layer Orientation: vertical, horizontal, angled, circular, partitioned, etc. Rendering: up/downward, forward/backward, sideways, rotating, stationary, etc. Physical display medium, structure, & component design will vary, accordingly.

There may be several primary categories of 3D image displays, assimilated in the device design: Transient: suspended 3D image layers are in motion (in fluid display medium). Static: 3D image suspended in place, all dimensions (persistent image display, until explicitly cleared, or a new image display is generated—replacing the prior). Consecutive: a sequence of (2) or more 3D images, displayed in succession. Progressive (animation): progressive sequence of multiple 3D image displays, (potentially a rapid sequence of progressively altered 3D image renderings).

Several factors & considerations will determine variances in actual implementations: Display structure: container, construction (to generate, suspend, display image layers). Display medium: columns, flat surfaces, fluid (water, oil, air, other). Pixel object composition (material, size, construction, properties, characteristics). Orientation for rendering image layers: (vertical, horizontal, circular, stationary, other). Operation mode: automated, manual, semi-automated mechanism to render display. Fixed or variable image display (selective image data). Powered & controlled by: (electronic computer, manual operation, other mechanisms). Communication infrastructure (between components): conduit, lines, electronic signals. Other considerations: (for comprehensive 3D image rendering system). Practical, effective design (co-ordinated components, interfaces). Purpose and intended use: breadth of features, size, scale, technical complexity, etc. "Desktop" (small, hardcoded, limited features/images), or "large-scale" (extensive). Image data defined manually, (or computer interface to manage definitions). User interfaces (for operation, data definition, system management). "Open" architecture (extensible, transparent), or "Closed" ("blackbox"). Turn-key (assembled, ready to use "out-of-box"), or model/"kit" for building. Inherent Requirements: Viewing medium: rendered 3D image can be observed from all lateral sides, angles. Display device presents clear visibility of all image layers; (i.e. the view can not be visually obscured by the structure, or by other image layers). Layers of pixel objects must be suspended, relatively equidistant from other layers. Image generation must be a repeatable process, (able to generate consecutive images). Support for resetting the display environment—to a "ready state" for image rendering (automated or manual process), e.g. reprocessing pixel objects, reposition apparatus. Supports selecting a particular image for display, by user (from stored set of images). Supports user interface: for operation, image selection for display, (other interaction). Support storage & retrieval of image data definition (e.g. data management system), Supports mechanism and UI for defining, customizing image definitions (manually). Optionally: automated (programmatic) process for creating, translating image data. Optionally: supports automation (or semi-automation) for image rendering operation. Incorporates all aspects of safety in design and implementation, for all variations. Image Graphic Quality (in the MIRS environment). Subjective (to some extent), characterized by the following factors; Rendering Speed: time required to generate single image, (or sequence of multiple, consecutive images). Image Resolution: density of pixel points, dependent up display device configuration, size and spacing of pixel objects, (in rows, columns, and layers). Visual Contrast: the degree that the 3D image pattern produced is visibly discernable and recognizable, relative to the display medium. Aesthetics: (visual) characteristics of: image content, display structure, display medium, pixel objects, device presentation, rendering mechanism.

VARIATION "PLATFORM" DISPLAY DEVICE, WATER Display Medium. Display device: WATER container (aquarium, modified; with air-chamber grid, bottom). Pixel objects: AIR BUBBLES [uniform units of air, displaced into water medium]. ACTION: units of air are displaced from individual air-chambers at specified intervals and arrangements; buoyant pixel objects (air bubbles) float upward, rendering layers of the image. INTERFACE: driven by (component) LINE-FEED CHASSIS.

VARIATION DATA DEFINITION, DATA-READER DEVICE (manual operation). Input Data Grid: (stored data definition) specifies coordinates of pixel points to display. Data Grid Reader: determines the image display coordinates (per layer), as specified & stored on the Input Data Grid. Sensors of the Data-Reader transmit corresponding motion to a series of levers, (initiating the control flow of the image rendering process). COMPONENT DESCRIPTION: —Input Data Grid—Plastic grid of "squares", covered with cardboard surface to specify data: perforated squares indicate value: "ON", or 1 (denotes: "display a pixel object for this location"). Each grid SQUARE represents a single pixel point of the entire displayed image. Each grid ROW represents a (horizontal) 2D LAYER of pixel points, of the image. Each grid COLUMN represents a pixel point of the image, on each particular layer. User interaction: initiates primary mechanisms for control-flow, image generation. The Input Data Grid is steadily fed through the Data-Reader, (by hand). Tactile "sensors" on the Data-Reader detect perforations on the flat grid surface, moving forward the corresponding "levers", (on the connected apparatus). INTERFACE: interacts with LINE-FEED CHASSIS, transmitting motion—via the Data Reader LEVERS.

VARIATION LINE-FEED CHASSIS DEVICE. Advances individual lines, a uniform distance—at specified intervals during generation of displayed image layers, (as driven by the Data-Reader component). A lever motion on the Data-Reader causes the corresponding "ratchet gear" (of the Line-Feed Chassis) to advance a single notch, advancing the attached line a uniform distance. COMPONENT DESCRIPTION: a series of [line-weighted] gravity-driven gears—each with a ratchet-pawl mechanism, to facilitate interaction with (component) Data-Reader LEVERS. Each gear is matched to a single lever of the Data-Reader. Each gear of the "line-feed chassis" is attached to a weighted line—and the other end of each line, is attached to a 'piston'—in a respective 'air-chamber', of the Display Device. ACTION: Each ratchet gear tends to advance, due to the gravity pull of their weighted lines. Individual gears are allowed to advance (a single notch), when corresponding levers of the Data-Reader move forward (releasing the ratchet-pawl)—thereby advancing the attached lines [a fixed distance], producing resultant actions in the Display apparatus. INTERFACE: Invoked by (component) Input DATA-READER: LEVER forward motion allows gears in the Line-Feed Chassis to advance ratchet location, advancing their respective lines. Interacts with (component) DISPLAY DEVICE: the length of line taken up for each LEVER movement (ratchet-pawl advance)—causes the 'piston' [attached to the line-end] to shift upward a fixed distance: thereby displacing a uniform air bubble from an aperture of the corresponding air-chamber, within the Display apparatus (water medium).

VARIATION DETAIL—AIR CHAMBER, WATER Display Medium, Air Chamber: cylinder (hollow tube, plastic), anchored to the "air-chamber grid". Stopper: seals top of the air chamber, to contain air pocket (solid acrylic, tight-fitting). Aperture: (small hole in cylinder side, to release air bubbles), located at halfway point. Piston: (solid acrylic bar, sinks in water), slightly narrower than the air chamber width. Line: (transparent/lightweight fishing line), fed through the aperture—tied to 'bead'. Bead (weighted, sinks): line attached—tied to hole in bead, (lifts 'piston' upward). Pixel objects: AIR BUBBLES [uniform units of air, displaced into water medium]. ACTION: Chamber is filled with air in upper portion, to the aperture level (where air will escape). As the piston is raised a fixed distance [upward of the aperture/water level], a unit of air is displaced from the chamber—forming an air bubble (pixel object), released to float up. After image generation, the contained air pockets are all replenished—via an air pump: directs forced air under the hollow chambers, opened underneath for refilling. INTERFACE: (direction of line movement, upward). Driven by (component) LINE-FEED CHASSIS. AIR CHAMBER DETAIL: Contained AIR pocket, in top of chamber. WATER (initially, fills to aperture level).

VARIATION "DESKTOP" DISPLAY DEVICE, WATER Display Medium. DISPLAY DEVICE requires user-interaction (manual operation) to execute the process. HARD-CODED data definition: (fixed) 3D image specification, defined within the device. —Display device: WATER container [small desktop aquarium], with air-chamber grid. Operation Handle: mechanism for user-interaction, to submerge "air-chamber grid". Air chambers: anchored to the 'air chamber grid' (travels to bottom of water container). The image definition is determined by physical contents placed within the air-chambers. Solid physical spheres: positioned beforehand INSIDE the AIR-CHAMBERS, represent specification of pixel points, (i.e. location & layer where pixel objects will be rendered). Pixel objects: AIR BUBBLES [uniform units of air, displaced by solid SPHERES into the water display medium], collectively forming the layered display of a 3D image. ACTION: (manual operation, user interaction). USER pushes steadily downward on the "handle"—connected to the air-chamber grid, causing the air chambers to travel downward. Stationary push-rods (underneath each of the air chambers) move the solid spheres into the upper air chambers (1 layer at a time). The solid spheres (appropriately positioned on layers, optionally separated by 'spacers'), displace discrete units of air through the air chamber apertures—forming a particular pattern of air bubbles—as configured, at each progressive LAYER of the image. The LAYERS of buoyant pixel objects float upward—displaying the transient 3D image. After image generation, the USER "resets" the device—by lifting the handle upward, to raise apertures above the water line, allowing AIR to refill the top of each chamber.

VARIATION DETAIL—AIR CHAMBER, WATER Display Medium, facilitates FIXED pattern of pixel objects (air bubbles, water display medium). DESCRIPTION: Air Chamber: cylinder (hollow tube, plastic), anchored to the "air-chamber grid". Stopper: seals top of the air chamber, to contain air pocket (solid acrylic, tight-fitting). Aperture: (small hole in cylinder side, to release air bubbles), located at halfway point. Spheres: (acrylic solid, to displace fluid/air), slightly narrower than the hollow tube. Spacers: thin/hollow tubes, provide void at layers where NO pixel object is specified. Push rods: (anchored underneath air chambers), shift SPHERES upward to displace air. Pixel objects: AIR BUBBLES [uniform units of air, displaced by SPHERES into water]. ACTION: Chamber is filled with air in upper portion, to the aperture level (where air will escape). When solid SPHERE travels above aperture [into air pocket], a unit of air is displaced from the chamber, to form an air bubble (pixel object)—released to float upward.

As used herein, the term "about" refers to plus or minus 10% of the referenced number. For example, an embodiment wherein the tank 310 is about 20 inches in length includes a tank 310 that is between 18 and 22 inches in length.

The following the disclosures of the following U.S. patents are incorporated in their entirety by reference herein: U.S. Pat. No. 7,006,056; U.S. Pat. No. 4,134,104; U.S. Pat. No. 5,790,086; U.S. Pat. No. 2,749,480; U.S. Pat. No. 5,037,105.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A multi-dimensional image rendering device for creating and displaying multi-dimensional images by layering two dimensional physical pixel configurations, said device comprising:
    (a) a plurality of generally hollow tubes each having a first end, a second end, and an inner cavity, the first ends of the tubes are closed, wherein the inner cavities of the tubes are each filled with a liquid medium such that an air pocket is disposed at the first end of each tube;
    (b) a tank filled with a liquid medium for housing the tubes;
    (c) a displacement component slidably disposed in the inner cavity of each tube, the displacement components can slide between multiple positions including a down position positioned near the second end of the tube and an up position positioned upwardly near the first end of the tube;
    (d) a tube aperture disposed in each tube providing access to the inner cavity of the respective tube, the tube aperture is positioned such that the tube aperture is below the liquid medium in the tube when the displacement component is in the down position and above the liquid medium when the displacement component is in the up position; and
    (e) a moving means operatively connected to each displacement component functioning to systematically move the respective displacement component a fixed distance between multiple positions including the down position and the up position, the movement of the displacement component a fixed distance from the down position to the up position creates uniform air bubbles, wherein the plurality of tubes are configured in patterns such that that the uniform air bubbles released form two dimensional layers which are further layered to create three dimensional images;
    wherein the moving means is a line having a first end attached to the displacement component and a second end, wherein the line extends through a line aperture disposed in each tube and is connected to an interface, wherein the lines are each operatively connected to a mechanical component designed to move the respective line, wherein the moving means are each manipulated manually or automatically on a computer system.

2. The device of claim 1, wherein a cap is removably attached to the first end of the tube.

3. The device of claim 1, wherein the displacement component is biased in the down position.

4. The device of claim 1, wherein the displacement component is biased in the up position.

5. The device of claim 1, wherein the displacement component is a shaft, a tube, or a piston.

6. The device of claim 1, wherein the displacement component is a sphere or one or more spheres, shafts, tubes, pistons, spacers, or a combination thereof.

7. The device of claim 1, wherein the liquid medium comprises water, oil, or a combination thereof.

8. The device of claim 1 further comprising an air pump and hose operatively connected to the moving means.

9. The device of claim 8, wherein the air pump is operatively connected to a power source.

10. A multi-dimensional image rendering device for creating and displaying multi-dimensional images by layering two dimensional physical pixel configurations, said device consisting of:
    (a) a plurality of generally hollow tubes each having a first end, a second end, and an inner cavity, the first ends of the tubes are closed, wherein the inner cavities of the tubes are each filled with a liquid medium such that an air pocket is disposed at the first end of each tube;
    (b) a tank filled with a liquid medium for housing the tubes;
    (c) a displacement component slidably disposed in the inner cavity of each tube, the displacement components can slide between multiple positions including a down position positioned near the second end of the tube and an up position positioned upwardly near the first end of the tube;
    (d) a tube aperture disposed in each tube providing access to the inner cavity of the respective tube, the tube aperture is positioned such that the tube aperture is below the liquid medium in the tube when the displacement component is in the down position and above the liquid medium when the displacement component is in the up position; and
    (e) a moving means operatively connected to each displacement component functioning to systematically move the respective displacement component a fixed distance between multiple positions including the down position and the up position, the movement of the displacement component a fixed distance from the down position to the up position creates uniform air bubbles, wherein the plurality of tubes are configured in patterns such that that the uniform air bubbles released form two dimensional layers which are further layered to create three dimensional images;
    wherein the moving means is a line having a first end attached to the displacement component and a second end, wherein the line extends through a line aperture disposed in each tube and is connected to an interface, wherein the lines are each operatively connected to a mechanical component designed to move the respective line, wherein the moving means are each manipulated manually or automatically on a computer system.

* * * * *